Figure 1:
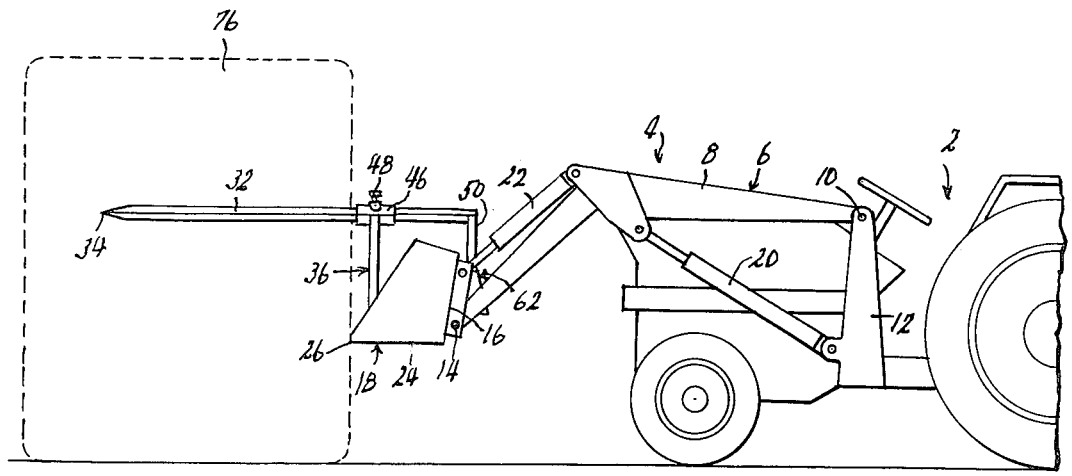

United States Patent [19]

Schremmer

[11] 4,275,985
[45] Jun. 30, 1981

[54] HAY BALE HANDLING DEVICE

[76] Inventor: Stanley M. Schremmer, P.O. Box 143, Utica, Kans. 67584

[21] Appl. No.: 29,207

[22] Filed: Apr. 12, 1979

[51] Int. Cl.³ ............................................. E02F 3/00
[52] U.S. Cl. .................................. 414/722; 414/724; 414/24.5
[58] Field of Search ............... 414/722, 726, 727, 607, 414/724, 785; 37/117.5; 172/272, 253, 252, 247

[56] References Cited

U.S. PATENT DOCUMENTS

| 3,795,331 | 3/1974 | Guest | 414/724 |
| 3,834,567 | 9/1974 | Miller | 414/724 |
| 3,908,844 | 9/1975 | Duffield | 414/724 |
| 3,921,837 | 11/1975 | Vandewater | 414/724 |

FOREIGN PATENT DOCUMENTS 2511125  9/1976  Fed. Rep. of Germany ......... 414/24.5

Primary Examiner—Leslie J. Paperner
Assistant Examiner—L. E. Williams
Attorney, Agent, or Firm—John A. Hamilton

[57] ABSTRACT

A hay bale handling device adapted for use in connection with an ordinary front end loader attachment of a farm tractor, and consisting of a generally forwardly directed prong, or "spear" fixed to the scoop of the loader, so that the spear can be driven into a bale by driving the tractor forwardly, and can use the usual scoop controls for lifting, transporting and depositing the bale. The structure for mounting the spear on the scoop is quickly detachable to permit normal use of the loader, and is easily adjustable to permit mounting of the spear on loader scoops of various sizes and shapes.

4 Claims, 5 Drawing Figures

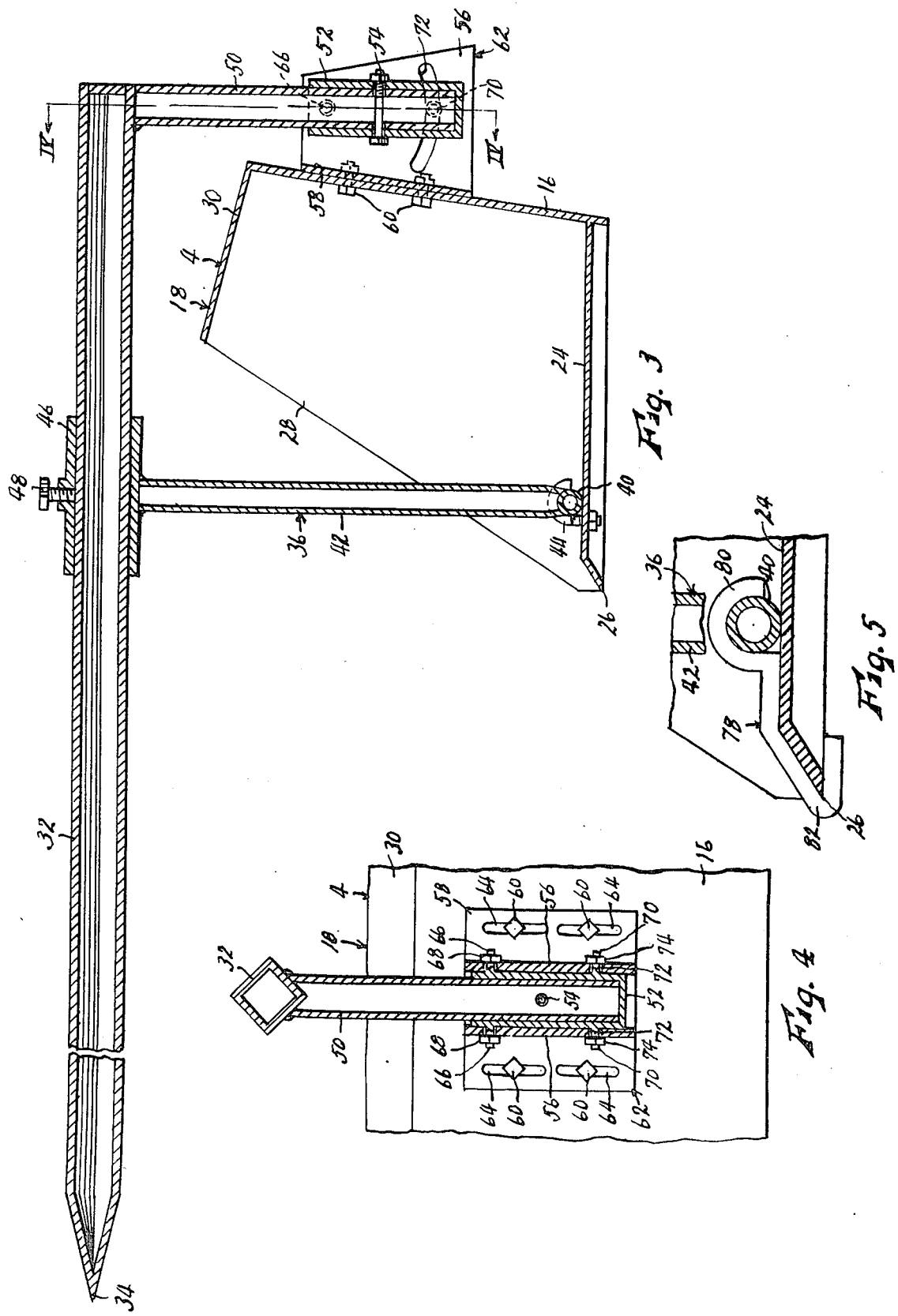

HAY BALE HANDLING DEVICE

This invention relates to new and useful improvements in devices for handling large bales of hay, particularly, though not limited to, cylindrical bales of about six feet in diameter and about five feet in axial length. The use of bales of this type has become very popular in recent years for various reasons, but their large size and weight, often 1500 to 2000 pounds, of course creates special problems in their handling and transportation. Many devices for this purpose have been created, but all of them within my knowledge have been relatively complicated and hence expensive devices, requiring extensive structure and power operating features not useful for any other purpose than bale handling. Accordingly, the primary object of the present invention is the provision of a bale handling device which is extremely inexpensive as compared the prior devices intended for the same purposes, since it constitutes on attachment to the ordinary front end loader attachment of a farm tractor, and utilizes many features of the loader in the handling of hay bales. Due to their great utility and wide variety of usages, a high percentage of farms and ranches already have at least one front end loader for use on their tractors.

More specifically, an object of the present invention is the provision of a hay bale handling device consisting of a straight prong, or spear, having means for mounting it rigidly on the scoop of a front end loader, to extend forwardly therefrom. The provisions of the loader for lifting and tilting the scoop may then be utilized for penetrating, lifting, transporting and depositing a bale of hay as desired.

Another object is the provision of a bale handling device of the character described wherein the means affixing the spear to the scoop is readily detachable, so as not to interfere with other normal usages of the loader.

A further object is the provision of a bale handling device of the character described wherein the mounting means for the spear is adjustable to scoops of many different sizes and shapes. Also the mounting, once adjusted, may be left permanently affixed to the scoop so that no further adjustment is necessary when the spear is subsequently re-mounted. Said mounting is affixed to the outside of the rear wall of the scoop, in which position it does not interfere with normal usage of the loader.

Other objects are simplicity and economy of construction, efficiency and dependability of operation, and ease and convenience of use.

Figure 2:
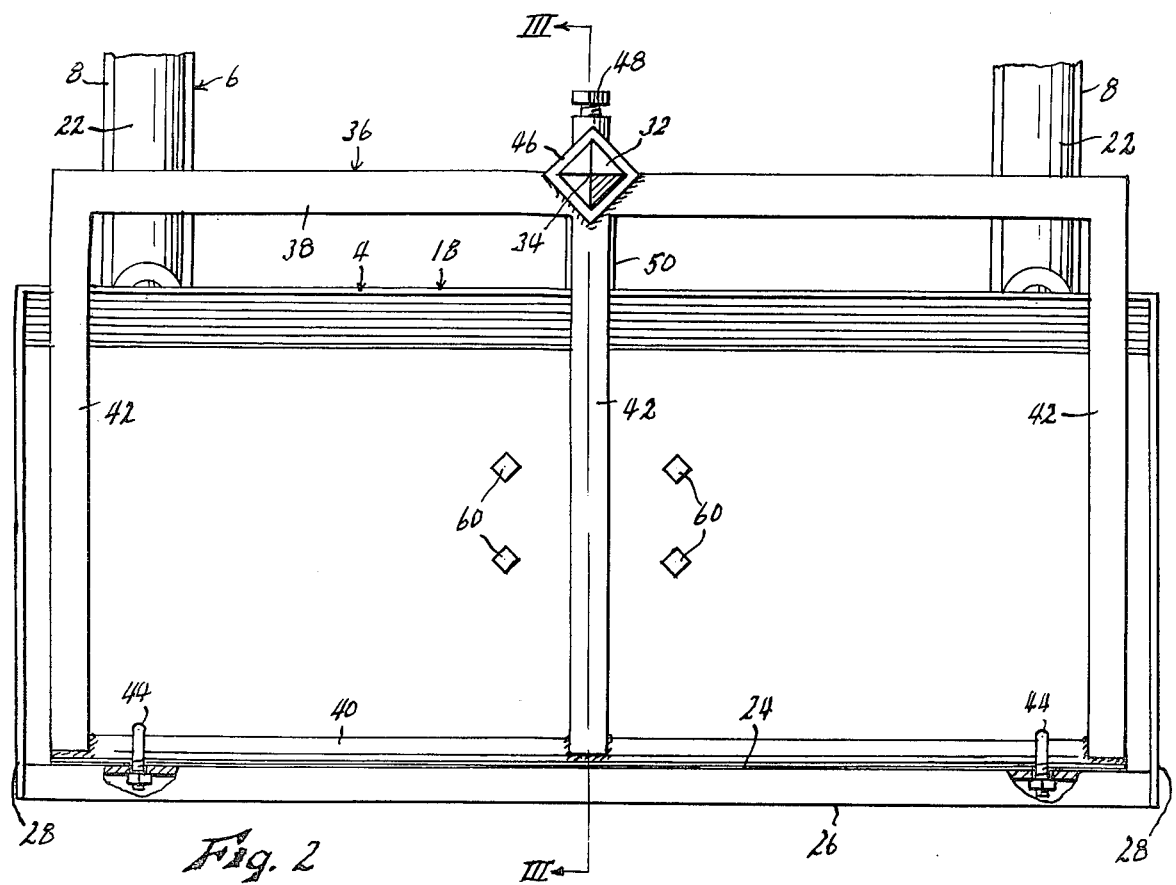

With these objects in view, as well as other objects which will appear in the course of the specification, reference will be had to the accompanying drawing, wherein:

FIG. 1 is a side elevational view of a hay bale handling device embodying the present invention, shown operatively attached to the front end loader of a farm tractor, and with the spear penetrating a hay bale, FIG. 2 is an enlarged front elevational view of the handling device and the loader scoop, FIG. 3 is a sectional view taken on line III—III of FIG. 2, FIG. 4 is a fragmentary sectional view taken on line IV—IV of FIG. 3, and FIG. 5 is an enlarged fragmentary view similar to FIG. 3, showing a slight modification of structure.

Like reference numerals apply to similar parts throughout the several views, and in FIG. 1, the numeral 2 applies generally to a farm tractor of ordinary design. Mounted on said tractor is a front end loader 4 also of ordinary design. Generally, said loader constitutes a rigid arm 6 comprising a pair of laterally spaced apart arms 8 disposed at respectively opposite sides of the tractor, and rigidly connected together by cross members, not shown. Each arm 8 is pivoted at its rearward end, as at 10, to a standard 12 affixed to the tractor frame, on a horizontal axis transverse to the tractor. Said arms are upwardly angled, extend forwardly of the tractor, and are pivoted at their forward ends, as at 14, to the rear wall 16 of a generally forwardly opening scoop 18, also on a horizontal transverse axis. Each arm 8 is interconnected to its associated standard 12 by a hydraulic ram 20, and said rams are powered by the hydraulic system of the tractor, through suitable controls, not shown, by the driver, whereby arm 6 may be pivoted upwardly or downwardly. Similarly, each arm 8 is interconnected to the rear wall of scoop 18, at a point above the connection of arms 8 thereto, by a hydraulic ram 22. Hence arm 6 may be pivoted to dispose scoop 18 at any desired elevation above the ground, and the scoop may be pivoted to be disposed at any desired degree of inclination relative to the arm. The structure thus far described is extremely common and well known in the art, and further detailing thereof is hence believed to be unnecessary. Scoop 18, in addition to rear wall 16, normally includes a floor 24 the forward edge of which forms a horizontal, transverse blade 26 and vertical side walls 28, and may also include an abbreviated top wall 30 extending forwardly from the top edge of rear wall 16. Various models of scoops in common use vary considerably in size, and also vary as to the inclination of rear wall 16 and top wall 30 relative to floor 24.

The bale handling attachment for the loader, as contemplated by the present invention, includes a straight, elongated prong, or "spear", 32 adapted to be disposed above scoop 18, parallel to scoop floor 24, and lying in the extended vertical midplane of tractor 2. Said spear extends several feet forwardly of the scoop, and also somewhat rearwardly therefrom. It is of course pointed at its forward end, as at 34, and as shown is formed of square tubular stock, turned so that a diagonal thereof is disposed vertically, in order to impart thereto a greater strength against vertical bending loads.

Spear 32 is rigidly affixed to the loader scoop, both rearwardly of rear wall 16 thereof, and generally at the mouth of the scoop. At the mouth of the scoop, there is provided a rectangular frame 36 disposed in a generally vertical plane, and extending transversely of the scoop, generally filling the mouth thereof. Said frame includes a top cross bar 38, a bottom cross bar 40 which may constitute a length of round pipe, and any desired number of vertical bars 42 extending between and rigidly affixed to said top and bottom cross bars. Bottom cross bar 40 rests on scoop floor 24, extending transversely of the scoop preferably several inches behind the forward blade edge 26 thereof, and is detachably affixed thereto by a pair of J-bolts 44 disposed respectively adjacent the opposite ends thereof. At the midpoint of top cross bar 38 there is welded a square sleeve 46 which extends forwardly and rearwardly, and corresponds in cross-sectional contour to spear 32. Said spear extends slidably through said sleeve, but may be affixed therein by means of a set screw 48. Frame 36 is of a vertical height to support spear 32 well above the top of scoop 18, when the scoop is of any size in common usage.

Spear 32 extends rearwardly of the scoop, and has depending leg 50 rigidly affixed to its rearward end. Said leg extends downwardly in spaced apart relation from rear scoop wall 16, and its lower end portion is received slidably in an open-topped socket member 52, being detachably securable therein if desired by means of a bolt 54 inserted through matching holes thereof. Socket 52 is disposed between a pair of parallel vertical plates 56 extending rearwardly from a base plate 58 secured against rear scoop wall 16 by means of bolts 60, plates 56 and 58 conjointly constituting a mounting bracket designated generally by the numeral 62. Bolts 60 are engaged in vertically elongated slots 64 of plate 58, in order that upon loosening of said bolts, said bracket may be adjusted vertically relative to rear scoop wall 16. Adjacent its upper end, socket 52 is provided with a pair of bolt studs 66 projecting laterally from the opposite sides thereof, said studs projecting through matching holes of plates 56 and being provided with nuts 68 externally of said plates. Similarly, the socket is provided adjacent its lower end with another pair of bolt studs 70 parallel to studs 66 and projecting outwardly through arcuate slots 72 formed in plates 56 concentrically with studs 66, and having nuts 74 threaded on their outer ends. Bracket 52 may be pivoted on studs 66 when nuts 68 and 74 are loosened, but is clamped rigidly in place relative to bracket 62 when the nuts are tightened.

In the initial installation of the device on the loader scoop, holes are drilled in floor 24 for J-bolts 44, and in rear wall 16 for bolts 60, and bracket 62 is secured loosely to the scoop by bolts 60, with nuts 68 and 74 of the bracket also loosened. Leg 50 of spear 32 is then inserted into socket 52 and secured therein by bolt 54. Sleeve 46 is then threaded over the forward end of the spear, and moved rearwardly therealong until bottom cross bar 40 of frame 36 rests on floor 24 of the scoop at the position it will be secured thereto by J-bolts 44. Bracket 62 and sleeve 46 are then adjusted to dispose spear 32 in the desired relationship to floor 24, usually but not necessarily parallel thereto. These adjustments may involve vertical adjustment of bracket 62 on wall 16 to compensate for variations in vertical heights of various types of scoops, after which bolts 60 are tightened, the pivoting of socket 52 on studs 66 to compensate for variations in the slope of rear scoop wall 16, after which nuts 68 and 74 are tightened, and the sliding of sleeve 46 along the spear to a position to permit frame 36 to be secured by J-bolts 44, after which set screw 48 is tightened. J-bolts 44 are then inserted and secured, and the installation is complete. The latter adjustment compensates for variations in the front to rear depth of the scoop, since it is desirable, for reasons to be described, that frame 36 be disposed at a certain distance, not critical but about six inches, behind the blade edge 26 of the scoop floor. When desired, the spear may be detached from the scoop after removing only bolts 54 and 44, by simply lifting spear leg 50 from socket 52, leaving bracket 62, now properly adjusted permanently affixed to the scoop, so that the next attachment of the spear to the scoop is quick and simple, requiring no adjustments. In its position behind the scoop, bracket 62 will not interfere with any normal usage of the scoop and loader.

In a normal operation of the device, spear 32 is lowered and levelled, by operation of hydraulic rams 20 and 22 to an elevation suitable for penetrating a hay bale resting on the ground, and indicated at 76 as resting on its side, and parallel to the ground. Preferably, although this is not essential to the present invention, the spear is positioned to penetrate the bale somewhat above center, since the center core of a bale is usually too loosely packed to provide good support for the bale on the spear when the latter is elevated, and also because the bale is thus rendered less likely to turn on the spear when the latter is elevated, its heaviest portion already being disposed below the spear. Tractor 2 is then driven forwardly to insert the spear into the bale, as shown in FIG. 1, until blade 26 of the scoop engages the end of the bale. The bale is then lifted from the ground by extending hydraulic rams 20, and tilted as desired, at any elevation, by extension or retraction of hydraulic rams 22. Preferably, rams 22 are set to tilt the spear upwardly toward its forward end, whenever the bale is elevated. This prevents the bale from slipping off of the spear by gravity. Instead, the bale tends to slide rearwardly on the spear, until it rests against frame 36 and scoop blade 26. Frame 36 not only acts as a leg supporting spear 32 against the substantial weight of the bale, but also forms a backstop for said bale, preventing loosely packed bales from collapsing into the scoop. When the spear is tilted upwardly, frame 36 also supports a portion of the weight of the bale, removing that proportion of the bale weight from the spear, and thus rendering it less likely that the bale might tear loose from the spear when the tractor is subsequently driven over possible rough terrain to transport the bale. Also, when the spear is tilted upwardly, rearward slippage of the bale thereon tends to press the bale end firmly against scoop blade 26, causing said blade to indent the bale sharply. This indentation further secures the bale against turning about the spear as an axis, and also causes said blade to support a further portion of the weight of the bale, and these factors in turn render it still less likely that the bale could tear loose from the spear during transport. It is for this reason that frame 36 is spaced substantially behind blade edge 26 of the scoop. The bale is released from the spear, when the bale is elevated above the ground, simply by actuating rams 22 to tilt the spear downwardly and forwardly, whereupon the bale slides off of the spear by gravity. The bale may be deposited on end by tilting the spear rapidly and steeply, or may be deposited on its side by tilting it downwardly only slightly, then lowering it to engage the ground at its forward end, and finally backing the tractor. Uses of the device are numerous. It may be used, for example, to load bales into grinding machines, or into livestock feeders, or to load bales onto truck beds or the like for transport. Also, by tilting the spear sharply downwardly, but taking care to keep its point free of the ground, it may be used as a "pusher" for unrolling bales on the ground, for easier feeding by livestock. Other uses will readily suggest themselves.

As previously discussed, spear 32 and frame 36 may be quickly and easily detached by removal of bolt 54 and J-bolts 44, leaving mounting bracket 62 permanently affixed to the scoop, fully adjusted, for quick and easy remounting of the spear whenever its use is desired, since being positioned behind the scoop as shown, said bracket does not interfere with other normal usages of the loader. As a matter of fact, bolt 54 may usually be dispensed with if desired, since any usual loading of spear 32 tends to pivot frame 36 in J-bolts 44, and this in turn tends to move spear leg 50 with a motion having a component transverse to the axis of socket member 52. Since the leg cannot escape from the socket laterally thereof, it is effectively locked in the socket.

It will be apparent also that the illustrated mounting of the spear on the scoop permits intentional tilting of the spear from its normal parallel relation to scoop floor 24 whenever this may be desired. For example, if the scoop must be lowered to ground level to insert the spear into a bale, and if the insertion must be made on a downhill slope, then the bale may tend to slip from the spear after the bale is lifted from the ground, but before the spear can be tilted upwardly and forwardly. To prevent this, it may be desirable to adjust the spear to a permanent upward slope relative to the scoop floor. This may be done by loosening bolts 60 to lower bracket 62 on rear scoop wall 16, loosening nuts 68 and 74 and pivoting socket 52, and loosening set screw 48 and moving sleeve 46 along the spear.

FIG. 5 shows a modification of structure permitting still easier attachment and detachment of the spear to and from the scoop. In this modification, a hook member 78 is substituted for each of J-bolts 44. Hook member 78 comprises a length of rod stock formed at its forward end to present an eye 80 of less than full circular extent pivoted on bottom cross bar 40 of frame 36, and at its forward end to present an open hook 82 engageable rearwardly over the blade edge 26 of the scoop. This mounting is acceptably secure for most purposes. Of course, this form of attachment requires that set screw 48 be loosened, and slide 46 moved rearwardly or forwardly along the spear, in order respectively to engage or disengage said hooks from the blade edge.

While I have shown and described specific embodiments of my invention, it will be readily apparent that many minor changes of structure and operation could be made without departing from the spirit of the invention.

What I claim as new and desire to protect by Letters Patent is:

1. In combination with a tractor front end loader having a generally forwardly opening, open-mouthed scoop and means operable to vary both the elevation of said scoop above the ground and the angle of inclination of the open mouth thereof above and below horizontal, a hay bale handling device comprising:
    a. a straight elongated spear pointed at its forward end, said spear being adapted to extend forwardly and rearwardly over the top of said scoop, with the forward end thereof projecting forwardly from said scoop in a direction generally parallel to the direction in which the mouth of said scoop opens,
    b. front and rear legs extending generally vertically between said spear and said scoop respectively over the forward portion of said scoop and behind said scoop, and
    c. attaching means operable to secure the upper and lower ends of said legs respectively to said spear and to said scoop, whereby said spear is held rigidly in the described position, said attaching means being adjustable to vary the vertical angle of said spear relative to the direction in which said scoop opens.

2. The combination as recited in claim 1 wherein said attaching means for the upper and lower ends of said legs comprises:
    a. means connecting the upper end of said front leg to said spear and operable to permit fixedly adjustable movement thereof along said spear,
    b. means detachably connecting the lower end of said front leg to said scoop, and operable to permit pivotal movement of said front leg about a horizontal transverse axis at its lower end,
    c. means fixedly attaching the upper end of said rear leg to said spear, and
    d. means detachably connecting the lower end of said rear leg to said scoop, and operable to permit fixed vertical adjustable movement of the lower end of said rear leg relative to said scoop, and to permit fixed adjustable pivotal movement of the lower end of said rear leg about a horizontal transverse axis.

3. The combination as recited in claim 2 wherein said means attaching the lower end of said rear leg to said scoop comprises:
    a. a bracket affixed to a rear wall of said scoop, externally thereof, by means permitting adjustably fixed vertical movement of said bracket relative to said scoop wall, and
    b. a socket member mounted in said bracket by means permitting adjustably fixed pivotal movement of said socket member relative to said bracket about a horizontal transverse axis, said socket member being operable to receive the lower end portion of said rear leg slidably therein.

4. The combination as recited in claim 3 with the addition of means operable to secure the lower end of said rear leg detachably in said socket member.

* * * * *